(No Model.)
H. F. KEIL.
DOOR KNOB.
No. 447,613. Patented Mar. 3, 1891.
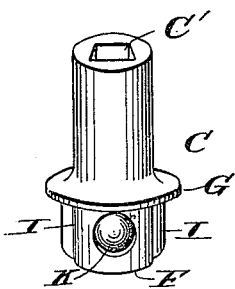
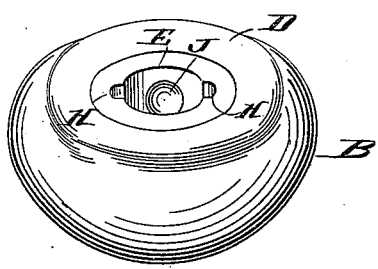
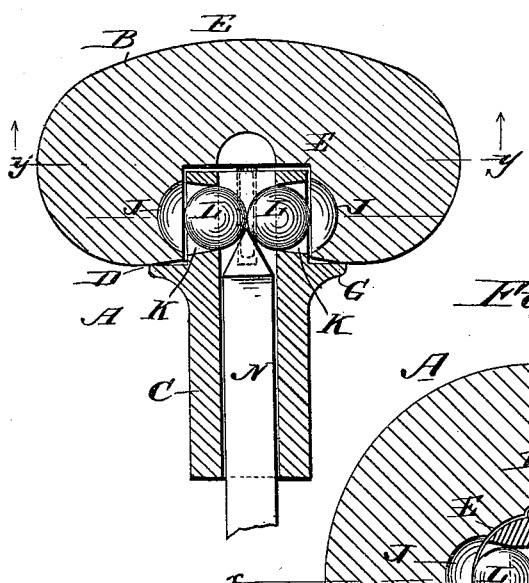
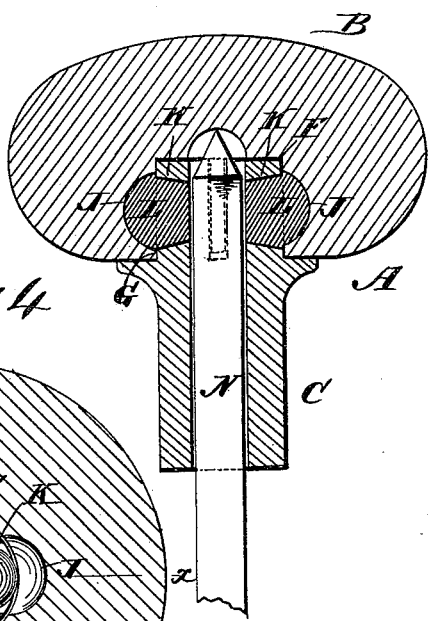
WITNESSES:
F. McArdle
C. Sedgwick
INVENTOR:
H. F. Keil
BY
ATTORNEYS

UNITED STATES PATENT OFFICE.

HENRY F. KEIL, OF NEW YORK, N. Y.

DOOR-KNOB.

SPECIFICATION forming part of Letters Patent No. 447,613, dated March 3, 1891.

Application filed June 24, 1890. Serial No. 356,522. (No model.)

*To all whom it may concern:*

Be it known that I, HENRY F. KEIL, of the city, county, and State of New York, have invented a new and Improved Door-Knob, of which the following is a full, clear, and exact description.

The object of the invention is to provide a new and improved door-knob in which the shank is secured to the head or handle in a very effective and simple manner.

The invention consists of a recessed head, a shank adapted to pass into the said head, and soft-metal balls pressed through openings in the shank to extend into the recesses in the said head.

The invention also consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a perspective view of the shank with balls placed therein. Fig. 2 is a perspective view of the head. Fig. 3 is an enlarged sectional plan view of the improvement on the line $x$ $x$ of Fig. 4. Fig. 4 is a sectional end view of the same on the line $y$ $y$ of Fig. 3, and Fig. 5 is a sectional plan view of the improvement as finished.

The improved door-knob A is provided with a head B and a shank C, having the usual central opening C' for the reception of the spindle. The head B is shaped in the usual manner and made of porcelain, clay, or other material. The head B is provided with the usual flat surface D and with a central recess E, adapted to be engaged by the part F of the shank C, so that the flange G on the said shank rests on the flat surface D. (See Figs. 3 and 5.)

In the central recess E of the head B are formed one, two, or more grooves H, adapted to be engaged by a corresponding number of lugs I, formed on the part F of the shank C, and serving to prevent the shank from turning in the head when the two parts are fastened together. In the wall of the recess E are also formed one, two, or more recesses J, preferably of semi-spherical form, as is plainly illustrated in Figs. 3, 4, and 5, the said recesses being adapted to register with openings K, formed in the part F of the shank C. The said openings K have slightly-beveled walls increasing in diameter toward the outside, as is plainly shown in Fig. 3.

In each of the openings K is held a ball or block L, extending to about the center of the opening C', so that two oppositely-arranged balls touch each other, as is plainly shown in Fig. 3, while their outer edges do not extend beyond the circumference of the part F of the shank, so that the latter can be introduced into the recess E without the balls interfering in the least. The said balls L are preferably made of a soft metal, and when the shank part F is in place in the recess E, as illustrated in Fig. 3, they are pressed apart by a suitably-constructed tool N, introduced through the central opening C' of the shank and provided at its inner end with a beveled or wedge-shaped end pressing the balls in opposite directions into the said openings K to extend into the recesses J. As the balls are made of soft metal, they readily conform to or press into the recesses J as well as the openings K, thus locking the shank C in place in the head B, and at the same time preventing the said balls from passing out of the openings K on account of their beveled walls. When the two balls or metallic locks L are pressed into the recesses J, the part F of the shank is firmly fitted into the recess E, so that the flange G rests snugly against the flat surface D of the head B. The tool N is withdrawn after the balls are pressed into place, and the shank is then ready to receive the spindle in the usual manner. Thus it will be seen that the shank is secured in a very simple and effective manner to the head.

Having thus fully described my invention, I claim as new and desire to secure by Letters Patent—

1. A door-knob comprising a recessed head, a shank engaging the said head, and soft-metal balls pressed into and filling recesses in the said head and openings in the said shank, substantially as shown and described.

2. In a door-knob, the combination, with a shank having a central opening and one or more side openings the walls of which are tapering, of a ball held in each side opening, a head having recesses adapted to receive the said shank and to register with the side openings in the said shank to permit of pressing the ball held in the side opening into the corresponding recess in the head, and lugs held on the said shank and adapted to engage grooves in the said head to prevent the shank from turning, substantially as shown and described.

HENRY F. KEIL.

Witnesses:
    THEO. G. HOSTER,
    C. SEDGWICK.